United States Patent
Raetzman et al.

(10) Patent No.: US 9,668,401 B2
(45) Date of Patent: Jun. 6, 2017

(54) DOWN STOP FOR AGRICULTURAL CLOSING DISCS

(71) Applicant: CNH Industrial America LLC, New Holland, PA (US)

(72) Inventors: Ryan R. Raetzman, Lemont, IL (US); Brian J. Anderson, Yorkville, IL (US); Johnathon R. Dienst, DeKalb, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 65 days.

(21) Appl. No.: 14/788,087

(22) Filed: Jun. 30, 2015

(65) Prior Publication Data

US 2017/0000013 A1    Jan. 5, 2017

(51) Int. Cl.
*A01C 7/20* (2006.01)
*A01C 5/06* (2006.01)
*A01B 49/06* (2006.01)

(52) U.S. Cl.
CPC .............. *A01C 5/066* (2013.01); *A01B 49/06* (2013.01); *A01C 7/203* (2013.01)

(58) Field of Classification Search
CPC combination set(s) only.
See application file for complete search history.

(56) References Cited

U.S. PATENT DOCUMENTS

| 4,307,674 A | 12/1981 | Jennings et al. |
|---|---|---|
| 4,637,328 A | 1/1987 | Topham et al. |
| 5,697,455 A | 12/1997 | Deckler |
| 5,829,535 A | 11/1998 | Line |
| 5,845,471 A | 12/1998 | Seegert et al. |
| 5,887,664 A | 3/1999 | Whalen et al. |
| 6,502,644 B2 * | 1/2003 | Steinlage ............... A01B 63/16 111/195 |
| 6,688,405 B2 | 2/2004 | Steinlage |
| 6,895,876 B2 | 5/2005 | Bergere et al. |
| 7,240,627 B1 | 7/2007 | Whalen et al. |
| 7,249,391 B1 | 7/2007 | Provines |
| 7,410,005 B2 | 8/2008 | Lung et al. |

(Continued)

FOREIGN PATENT DOCUMENTS

| EP | 0 878 117 A1 | 11/1998 |
|---|---|---|
| EP | 1 310 145 A2 | 5/2003 |

(Continued)

*Primary Examiner* — Alicia Torres
(74) *Attorney, Agent, or Firm* — Rebecca L. Henkel; Rickard K. DeMille

(57) ABSTRACT

A planting apparatus includes a chassis and a row unit carried by the chassis. The row unit includes a unit body carried by the chassis; a metering device carried by the unit body; at least one furrowing disc carried by the unit body; at least one pressing wheel carried by the unit body behind the furrowing disc in a direction of travel; a travel arm carried by and pivotally movable relative to the unit body that defines a travel path; at least one closing disc positioned behind the at least one furrowing disc and in front of the at least one pressing wheel in the direction of travel and pivotally movable along the travel path by the travel arm; and a stop placed in the travel path of the travel arm that is configured to limit a vertical travel of the at least one closing disc.

18 Claims, 5 Drawing Sheets

(56) References Cited

U.S. PATENT DOCUMENTS

| | | |
|---|---|---|
| 7,481,278 B1 | 1/2009 | Pomedli et al. |
| 7,681,656 B2 | 3/2010 | Jagow et al. |
| 7,857,072 B2 | 12/2010 | Kovach et al. |
| 7,946,232 B2 | 5/2011 | Patwardhan et al. |
| 8,186,287 B2 | 5/2012 | Schilling et al. |
| 8,275,525 B2 | 9/2012 | Kowalchuk et al. |
| 8,291,997 B2 | 10/2012 | Kovach et al. |
| 8,342,108 B2 | 1/2013 | Schilling et al. |
| 8,342,258 B2 | 1/2013 | Ryder et al. |
| 8,359,987 B2 | 1/2013 | Schilling et al. |
| 8,479,669 B2 | 7/2013 | Shoup |
| 8,635,962 B2 | 1/2014 | Schilling |
| 8,678,102 B2 | 3/2014 | Ryder et al. |
| 8,684,102 B2 | 4/2014 | Ryder et al. |
| 8,763,717 B2 | 7/2014 | Kovach et al. |
| 8,826,836 B2 | 9/2014 | Van Buskirk et al. |
| 2002/0050238 A1* | 5/2002 | Crabb .................. A01C 7/042 111/185 |
| 2011/0313575 A1 | 12/2011 | Kowalchuk et al. |
| 2013/0146318 A1 | 6/2013 | Bassett |
| 2013/0160684 A1 | 6/2013 | Whalen et al. |
| 2013/0206431 A1* | 8/2013 | Freed .................. A01B 49/027 172/1 |
| 2014/0151075 A1 | 6/2014 | Ryder et al. |
| 2014/0158385 A1 | 6/2014 | Ryder et al. |
| 2014/0224513 A1 | 8/2014 | Van Buskirk et al. |

FOREIGN PATENT DOCUMENTS

| | | |
|---|---|---|
| EP | 1 391 147 A1 | 2/2004 |
| EP | 1 723 842 A1 | 11/2006 |
| EP | 2 462 794 A1 | 6/2012 |
| WO | 2014/031858 A1 | 2/2014 |

\* cited by examiner

DOWN STOP FOR AGRICULTURAL CLOSING DISCS

BACKGROUND OF THE INVENTION

1. Field of the Invention

The present invention relates to agricultural planters, and, more particularly, to agricultural planter row units.

2. Description of the Related Art

Agricultural planters are commonly used implements to plant seeds in soil. An agricultural planter can include a chassis that carries one or more storage tanks carrying seed, and chemical applications that are to be applied to the field during the planting operation, a hitch mechanism that attaches to a tractor or other implement pulled by a tractor, and a tool bar that row units can be connected to so they are carried by the chassis. The planter can also include a pneumatic system carried by the chassis that supplies pressurized air to transport the seeds or other particulate from the storage tanks to the row units.

Each row unit of the agricultural planter places seeds in the field. Typically, the row units are laterally arranged along a length of the tool bar so that as the planter is pulled across the field, each row unit plants seeds at predefined intervals along the path it is pulled across. To plant seeds, the row units perform four main operations as they are pulled: opening a trench in the soil; placing a seed into the formed trench at appropriate intervals; closing the formed trench to put soil on top of the placed seed; and packing soil on top of the seed to provide desirable soil contact with the placed seed. To open a trench in the soil, a furrowing disc system, which may include an opening disc, cuts into the soil and rotates, dislocating soil as it rotates to form the trench. Once the trench is open, a seed is placed in the trench by a metering device which receives seeds from the main storage tank(s) or a row unit storage tank and typically utilizes a combination of differential air pressure, to select the seed, and gravity to place the seed in the trench at predefined intervals along the pulled path so that adjacent seeds in the row are not too close to one another. One or more closing discs carried behind the furrowing disc are pressed into the soil and also rotate as the planter is pulled to replace soil dislocated by the furrowing disc in the trench or dislocate adjacent soil into the trench to cover the seed placed in the trench with soil. Finally, a pressing wheel carried behind the closing disc(s) exerts pressure on the soil covering the seed to press the soil down onto the seed and provide good soil contact with the seed. By having multiple row units working in unison as the planter is pulled across a field, many seeds can be effectively planted in an efficient manner.

To collapse the formed trench and cover the placed seed with soil, the closing disc(s) must be in contact with the soil. In order to keep continuous contact with the soil, a biasing element may be connected to the closing disc(s) to force the closing disc(s) into the soil and resist upward forces that occur during travel from lifting the closing disc(s) out of contact with the soil. One problem that can occur is that the closing disc(s) can bury itself due to excessive downward travel and pressing into the soil. This can lead to soil flow problems, disrupted seed placement and tear-out of the trench sidewall.

What is needed in the art is a way to limit the vertical travel of the closing disc(s).

SUMMARY OF THE INVENTION

The present invention provides an agricultural planter equipped with one or more closing discs attached to a travel arm defining a travel path and a stop placed in the travel path to limit a vertical travel of the closing disc(s).

The invention in one form is directed to a planting apparatus including a chassis and a row unit carried by the chassis. The row unit includes a unit body carried by the chassis; a metering device carried by the unit body; at least one furrowing disc carried by the unit body; at least one pressing wheel carried by the unit body behind the furrowing disc in a direction of travel; a travel arm carried by and pivotally movable relative to the unit body that defines a travel path; at least one closing disc positioned behind the at least one furrowing disc and in front of the at least one pressing wheel in the direction of travel and pivotally movable along the travel path by the travel arm; and a stop placed in the travel path of the travel arm that is configured to limit a vertical travel of the at least one closing disc.

The invention in another form is directed to a closing assembly for an agricultural row unit that includes a mounting body; a travel arm pivotally connected to the mounting body that defines a travel path; at least one closing disc pivotally connected to the mounting body by the travel arm and movable along the travel path of the travel arm; and a stop placed in the travel path of the travel arm that is configured to limit a vertical travel of the at least one closing disc.

An advantage of the present invention is that the vertical travel of the one or more closing discs can be limited by the stop.

Another advantage is that the relative position of the stop in the travel path can be adjusted to change how much vertical distance the closing discs can travel.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
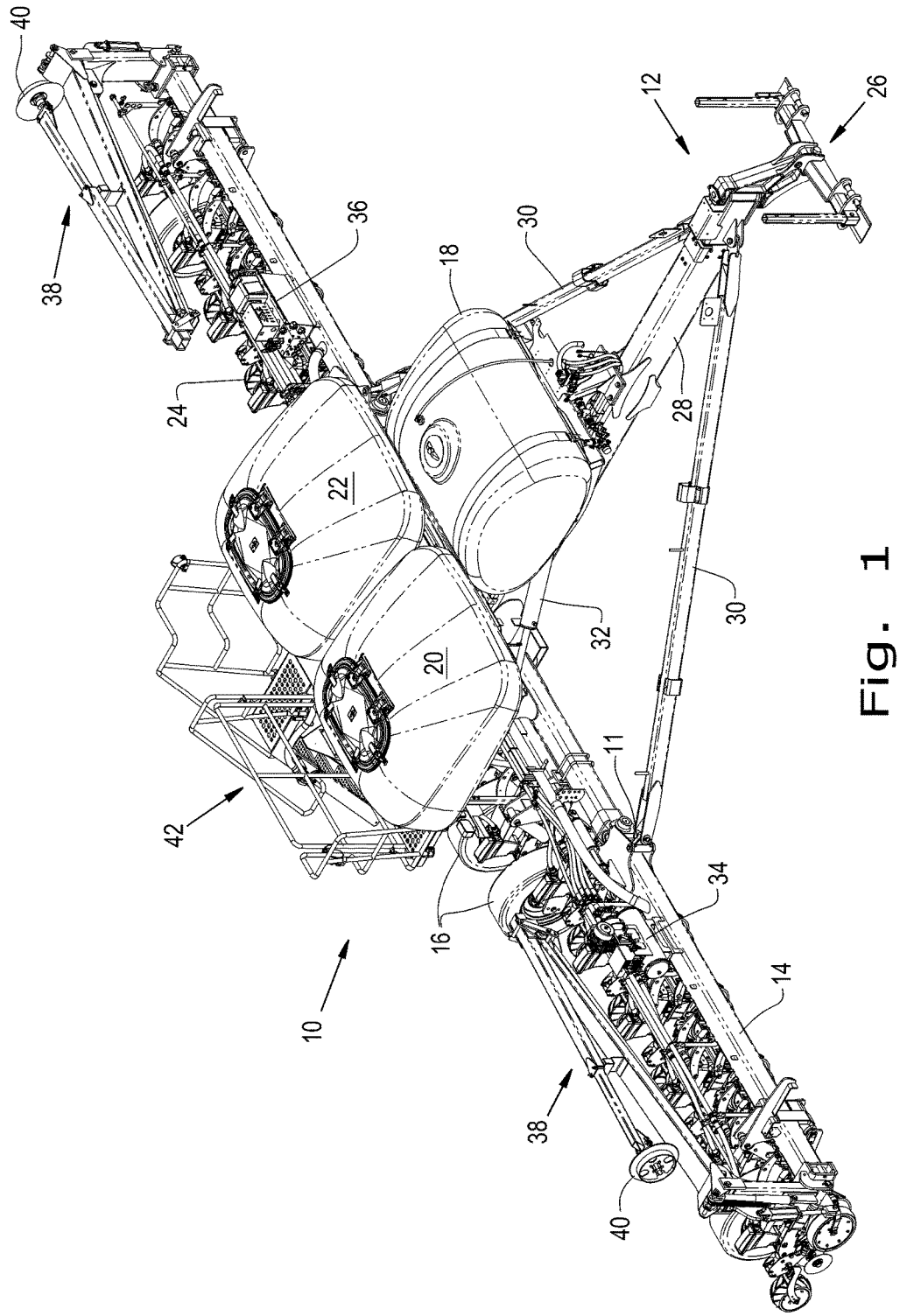
FIG. 1 is a perspective view of an embodiment of an agricultural planting apparatus according to the present invention.

Referring now to the drawings, and more particularly to FIG. 1, there is shown an embodiment of an agricultural planter 10 according to the present invention which generally includes a chassis 11 forming a support structure for components of the planter 10. The planter 10 can include a hitch assembly 12 at a front of the planter 10 connected to a tool bar 14 to form the chassis 11, main wheels 16 carried by the chassis 11 near a rear of the planter 10, one or more storage tanks 18, 20, 22 carried by the chassis 11 that can be filled with seed or other agriculture material, and a plurality of row units 24 connected to the tool bar 14 and arranged laterally across a length of the tool bar 14 so that they are carried by the chassis. The hitch assembly 12 can include a hitch 26 configured to be connected to a tractor or other agricultural implement (not shown) so that the planter 10 can be pulled in a forward direction of travel. The hitch 26 can be integrally formed with or connected to a hitch bar 28 that is connected to the tool bar 14 by bracing bars 30 and one or more cylinders 32. As can be seen throughout FIG. 1, the planter 10 can also have various hydraulic, pneumatic, and electrical lines (unnumbered) throughout to support various cylinders and systems that are included on the planter 10, such as a pneumatic system 34 connected to the tool bar 16 and an electric generator 36 also connected to the tool bar 16. A marking device 38 can be connected to each lateral end of the tool bar 14 and extendable so that a marking disc 40 of the marking device 38 can create a line in the soil as the planter 10 is pulled that helps a user in positioning the planter 10 to create subsequent rows. A stair assembly 42 can be mounted to the back of the planter 10 to allow an operator to access the storage tanks 20 and 22.

Figure 2:
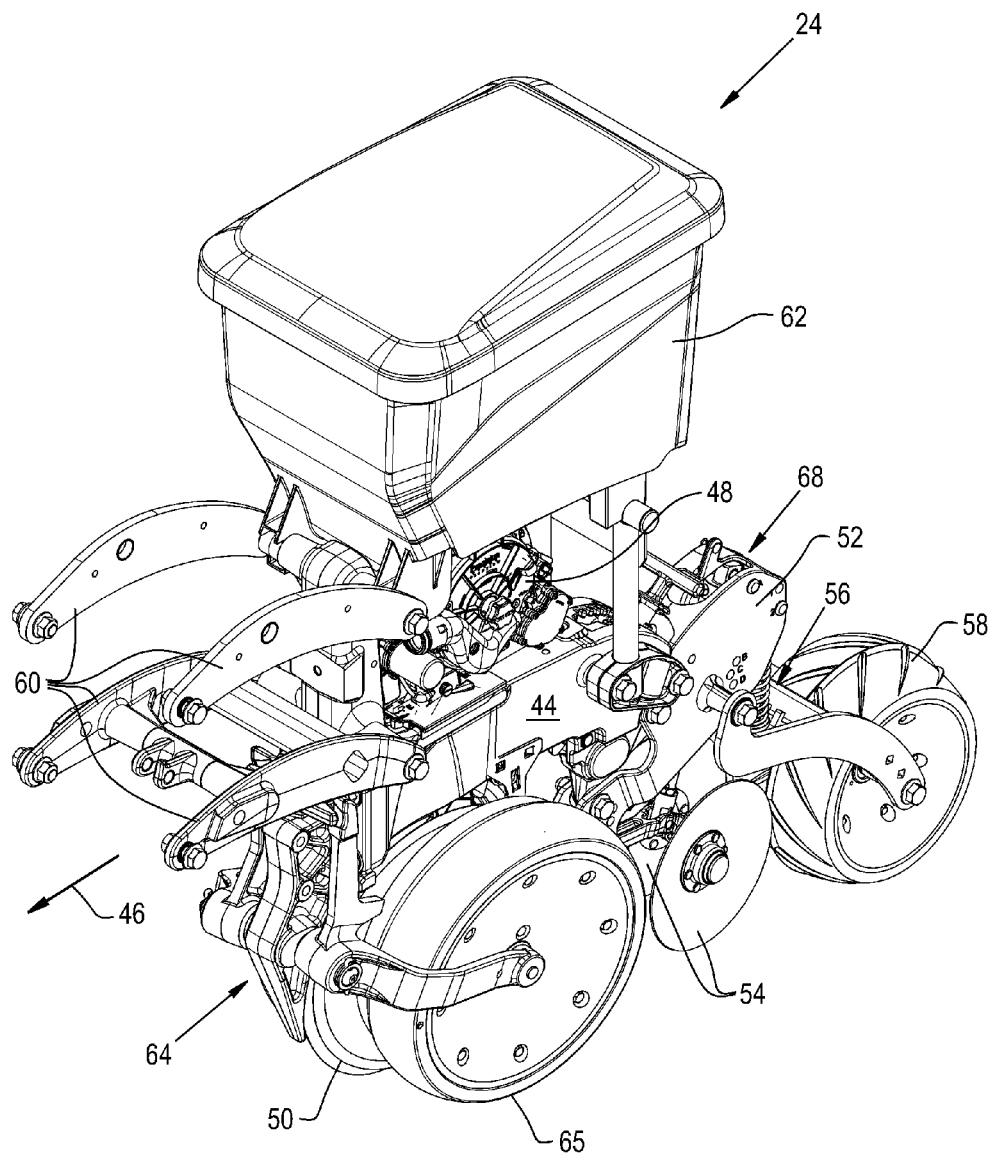
FIG. 2 is a perspective view of an embodiment of a row unit used on the planting apparatus shown in FIG. 1.

Referring now to FIG. 2, an embodiment of an individual row unit 24 is shown that is not connected to the tool bar 14. As can be seen, the row unit 24 generally includes a unit body 44 that can be carried by the chassis 11 in a direction of travel, signified by arrow 46, a metering device 48 carried by the unit body 44, a furrowing disc 50 connected to the unit body 44, a mounting body 52 connected to the unit body 44, closing discs 54 carried by the unit body 44, and a pressing wheel 58 connected to the mounting body 52 that is positionable behind the closing discs 54. As can be seen, the unit body 44 can have toolbar connecting arms 60 bolted thereon that can be connected to the chassis 11 in a parallel linkage arrangement so that the row unit 24 can be carried by the chassis 11 in the direction of travel 46. In this sense, the unit body 44 acts as a row unit chassis to keep the various components of the row unit 24 together during operation.

The metering device 48 carried by the unit body 44 is configured to receive seed from a unit storage tank 62 (also known as a mini-hopper) that is carried by the unit body 44 and can connect to one or more of the main storage tanks 18, 20 or 22. For ease of illustration, the electrical and pneumatic lines that would normally be connected to the metering device 48 have been omitted. The metering device 48 can be configured as any type of device which is capable of controllably metering out seeds to be planted by the row unit 24 during operation of the planter 10. For example, the metering device 48 can utilize a metering wheel (not shown) in combination with a vacuum formed in the metering device 48 to selectively pull seeds into a seed drop (not shown), where the vacuum is released and gravity causes the seed to drop into soil below. Other types of metering devices are known and could readily be adopted into the row unit 24 of the present invention.

The furrowing disc 50 carried by the unit body 44 presses into the soil and rotates as the planter 10 travels along a field, displacing soil in the field to form a trench. The furrowing disc 50 can have any type of construction that allows for it to rotate as it is carried along the field to form a trench in the soil, such as the annular disc shape shown. While only one furrowing disc 50 is shown, it is contemplated that two or more furrowing discs can be included in the row unit 24. Many different types of furrowing disc constructions are known and could be included in the row unit 24. Optionally, the furrowing disc(s) 50 can be connected to the unit body 44 by a furrowing suspension assembly 64 including one or more adjustable gauge wheels 65 that are configured to adjust the depth of the trenches formed by the furrowing disc(s) 50 as the planter 10 travels along the field. Any suitable furrowing suspension assembly can be used to connect the furrowing disc(s) 50 to the unit body 44.

The mounting body 52, as shown, is bolted to the unit body 44 so that it can carry the connected closing discs 54 and pressing wheel 58 with the unit body 44 as the planter 10 travels across the field. While shown as being a separable piece from the unit body 44, the mounting body 52 can also be an integral part of the unit body 44, if desired. The mounting body 52 can be hollow to cover various components of the row unit 24. The profile and mounting angle of the mounting body 52 can be adjusted to cover adjacent assemblies or parts, as desired.

The pressing wheel 58, as shown, is a circular wheel that is pivotally connected to the mounting body 52 and connected to a pressing suspension assembly 56 so that the pressing wheel 58 can pack soil onto the placed seeds as the row unit 24 travels. The pressing wheel 58 is positionable behind the closing discs 54 in the direction of travel 46, so that soil is packed onto seeds that are already surrounded by soil to increase the seeds' soil contact. The pressing suspension assembly 56 can help regulate the amount of packing force the pressing wheel 58 applies to the soil as it travels. Any suitable pressing wheel 58 and pressing suspension assembly 56 can be included in the row unit 24.

The closing discs 54 carried by the unit body 44 are held behind the furrowing disc 50 in the direction of travel 46 and also rotate as the planter 10 travels along the field. The closing discs 54 are configured to be dug into the ground and collapse the trench that is formed by the furrowing disc 50, by replacing the soil that is dislocated by the furrowing disc 50 or dislocating soil adjacent to the trench into the trench as the closing discs 54 rotate. Any suitable closing discs can be included in the row unit 24. The closing discs 54 can have a closing suspension assembly 66 connecting the closing discs 54 to the mounting body 52 that assists in keeping the closing discs 54 at a uniform level within the soil as the planter 10 travels across the field. While the row unit 24 is shown as including a pair of closing discs 54, it is contemplated that one closing disc or more than two closing discs could be used. Further, the closing discs 54 do not need to be connected to the mounting body 52, but can also be connected to the unit body 44 so that the closing discs 54 are carried in the direction of travel 46 as the planter 10 and row unit 24 travel along the field.

Figure 3:
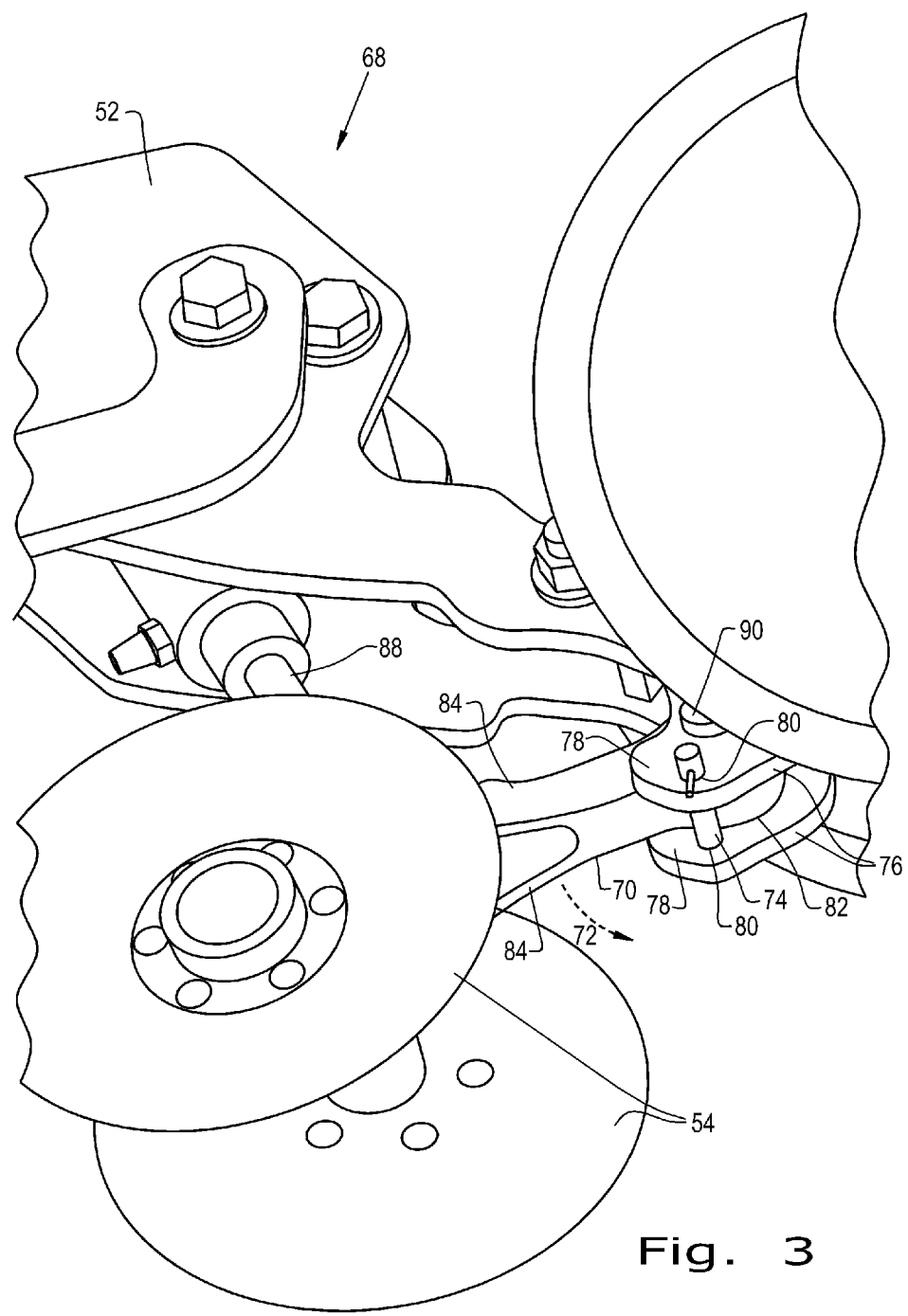
FIG. 3 is a perspective view of a portion of an embodiment of a closing assembly according to the present invention.
Figure 4:
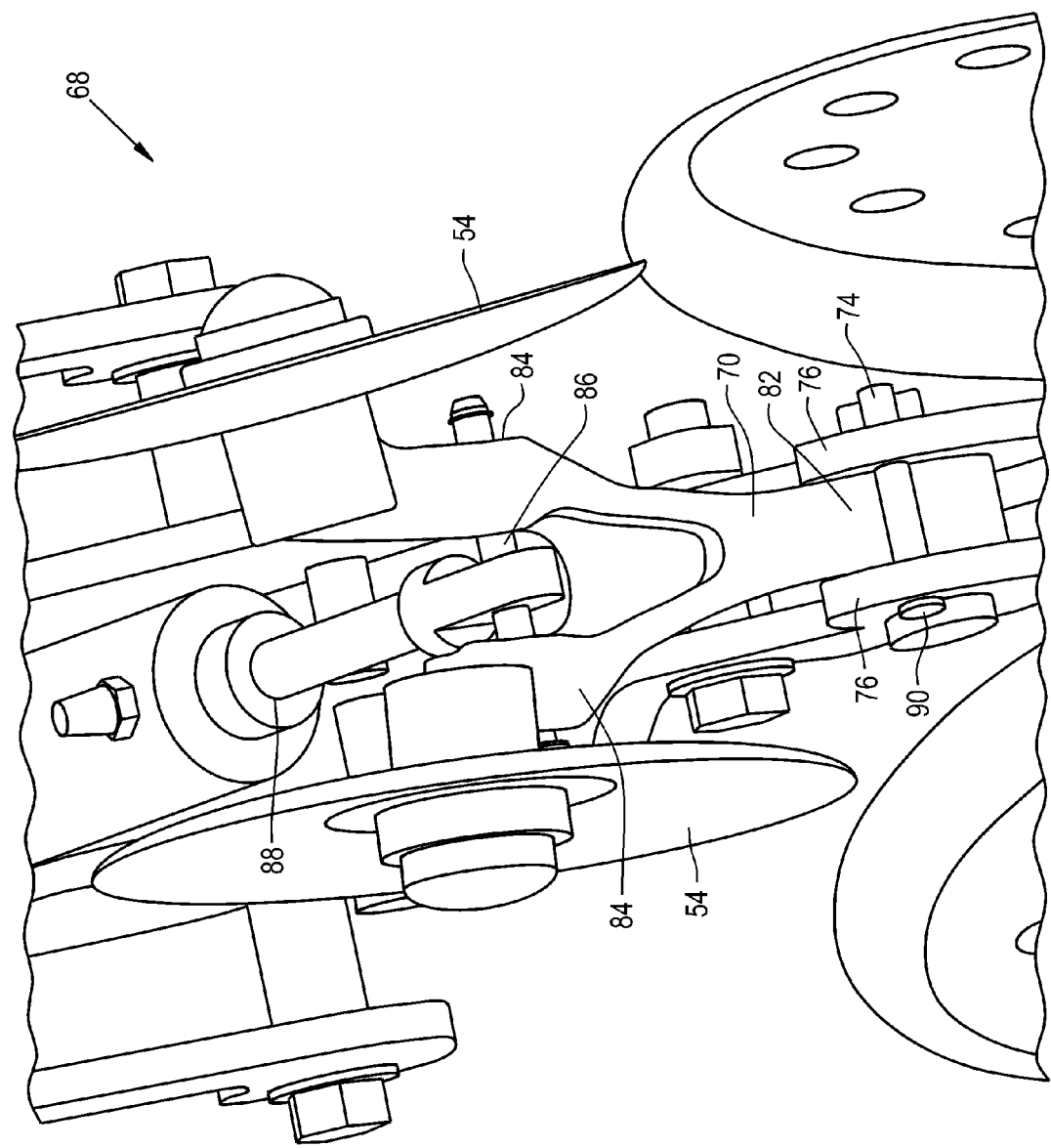
FIG. 4 is another perspective view of a portion of the closing assembly shown in FIG. 3.

Referring now to FIGS. 3-4, a closing assembly 68 is shown that includes the mounting body 52, a travel arm 70 pivotally connecting the closing discs 54 to the mounting body 52 and defining a travel path, indicated by dashed line 72, and a stop 74 placed in the travel path 72 of the travel arm 70 that limits a vertical travel of the closing discs 54. As used herein, "vertical" refers to the relative direction that gravity acts upon the row unit 24 as the row unit 24 travels across a ground surface, with the "upward" direction referring to movement away from the ground surface (opposite to gravity) and the "downward" direction referring to movement into or toward the ground surface (with gravity). It should be appreciated that the row unit 24 can be configured with the closing assembly 68 mounted to the unit body 44, as shown in FIG. 2, or the closing assembly 68 can be a separable assembly that is later connected to the row unit 24.

As can be seen in FIGS. 3-4, the mounting body 52 can include a pair of side plates 76 with a space formed therebetween. Each of the side plates 76 can have one or more stop openings 78, 80 formed therein that are sized to hold the stop 74, shown as a pin. Alternatively, only one of the side plates 76 can have one or more stop openings 78, 80 formed therein to hold the pin 74. Although the stop 74 is shown as a pin, other shapes and configurations can be chosen so long as the stop 74 can limit the vertical travel of the travel arm 70 and connected closing discs 54. The side plates 76 can be roughly identical, as shown, or different if desired. Each side plate 76 can have a first stop opening 78 that is aligned with a first stop opening 78 of the other side plate 76 and a second stop opening 80 that is aligned with a second stop opening 80 of the other side plate 76. By aligning the first stop openings 78 and second stop openings 80, the pin 74 can be held in both first stop openings 78 at the same time or both second stop openings 80 at the same time to limit the vertical distance that the closing discs 54 can be carried in the travel path 72 by the travel arm 70. In this sense, the maximum depth that the closing discs 54 can travel into the soil can be adjusted by changing the relative position of the stop openings 78, 80 on the side plates 76, which will alter where the pin 74 is held in the travel path 72 of the travel arm 70.

The travel arm 70, as shown, can include a pivot portion 82 pivotally connected to the mounting body 52 and one or more branch portions 84 that connect to the pivot discs 54. As can be seen in FIG. 4, a branching rod 86 (shown in FIG. 4) can connect the branch portions 84 to a biasing element 88, shown as a cylinder, to force the closing discs 54 in the downward direction and help keep the closing discs 54 engaged with soil as the row unit 24 travels across a field. The pivot portion 82 can be shaped with a circular cross-section and have an opening (not shown) that a mounting bolt 90 goes through to connect the travel arm 70 to the mounting body 52. The pivot portion 82 can be held within the space between the two side plates 76 of the mounting body 52, which can be useful to limit the side to side travel and rotation of the travel arm 70 during operation. In such a configuration, the distance between the two side plates 76 can be chosen to be slightly larger than the thickness of the pivot portion 82 so that there is limited sliding or rotation of the pivot portion 82 in the space. As shown, the travel path 72 of the travel arm 70 defines a circle with a radius that corresponds to the length of the travel arm 70 and is centered about the pivot portion's 82 connection to the mounting body 52 by mounting bolt 90. While the travel path is only illustrated with one dashed line 72, it should be understood that the travel path encompasses any location the travel arm 70 can travel, such as when the travel arm 70 pivots about the mounting bolt 90.

In operation, the closing discs 54 can be forced into the soil by the biasing element 88 exerting a downward force on the travel arm 70, which is connected to the closing discs 54, so that the closing discs 54 can maintain a desired contact with the soil. In some situations, the force that is applied to the closing discs 54 by the biasing element 88 may change. The change in applied force may be intentional to, for example, compensate for firmer soil conditions or caused by jolting forces that occur as the planter 10 carries the row unit 24 across the field. By placing the stop 74 in the travel path 72 of the travel arm 70, the amount of vertical travel that the travel arm 70 and connected closing discs 54 can undergo is limited by, for example, a bottom surface 92 of the travel arm 70 contacting a top surface 94 (shown in FIG. 5) of the stop 74, preventing the travel arm 70 and connected closing discs 54 from travelling any further in the travel path 72. While not shown, it should be appreciated that the stop 74 can also be placed so that the stop 74 limits the amount of upward travel that the travel arm 70 and connected closing discs 54 can undergo.

Figure 5:
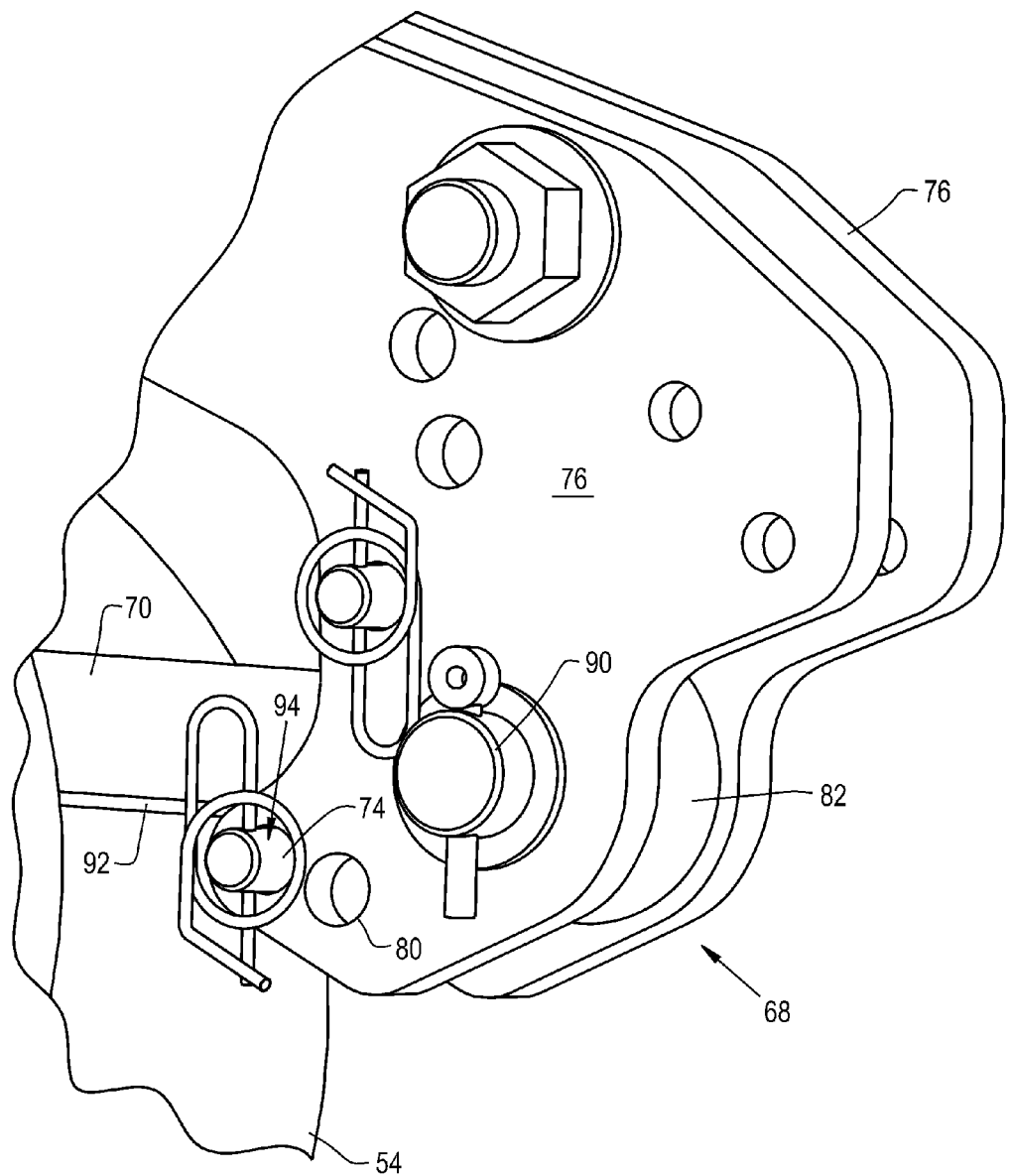
FIG. 5 is yet another perspective view of a portion of the closing assembly shown in FIGS. 3-4.

Referring now to FIG. 5, a portion of the closing assembly 68 is shown with the stop 74 held within first stop openings 78, rather than second stop openings 80 as shown in FIGS. 3-4. By adjusting the position of the stop 74 in the vertical direction, the amount of vertical travel that the travel arm 70 and connected closing discs 54 can undergo is adjusted. This allows an operator to adjust the maximum penetration depth that the closing discs 54 can have in the soil. The position of the stop 74 in the vertical direction can be adjusted by placing the stop 74 in differently positioned stop openings 78 and 80, as shown in FIGS. 3-5, or in any other suitable fashion that adjusts the relative position of the stop 74 in the travel path 72.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural planting apparatus, comprising:
   a chassis;
   a row unit carried by said chassis, said row unit including:
      a unit body carried by said chassis, a pair of surfaces carried by said unit body and defining a space therebetween;
      a metering device carried by said unit body;
      at least one furrowing disc carried by said unit body;
      at least one pressing wheel carried by said unit body behind said furrowing disc in a direction of travel;
      a travel arm carried by said unit body and being held in said space between said pair of surfaces, the travel arm pivotally movable relative to said unit body and defining a travel path;
      at least one closing disc positioned behind said at least one furrowing disc and in front of said at least one pressing wheel in the direction of travel and pivotally movable along the travel path by said travel arm; and
      a stop placed in the travel path of said travel arm and configured to limit a vertical travel of said at least one closing disc, said stop mounted to at least one of said pair of surfaces.

2. The planting apparatus according to claim 1, wherein said stop is adjustably placed in the travel path of said travel arm.

3. The planting apparatus according to claim 1, wherein at least one of said pair of surfaces has at least two stop openings formed therein, said at least two stop openings being sized to hold said stop therein.

4. The planting apparatus according to claim 3, wherein one of said at least two stop openings has a first vertical position and another of said at least two stop openings has a second vertical position different than said first vertical position.

5. The planting apparatus according to claim 3, wherein said stop is held in one of said at least two stop openings.

6. The planting apparatus according to claim 3, wherein said pair of surfaces each has at least two stop openings formed therein, said at least two stop openings of each pair of surfaces being sized to hold said stop therein.

7. The planting apparatus according to claim 6, wherein said at least two stop openings of one of said pair of surfaces are aligned with corresponding stop openings on the other of said pair of surfaces.

8. The planting apparatus according to claim 7, wherein said stop is held within two of said aligned stop openings.

9. The planting apparatus according to claim 1, further comprising a mounting body connected to said unit body, said pair of surfaces being a part of said mounting body.

10. The planting apparatus according to claim 9, wherein said mounting body includes at least two side plates defining said pair of surfaces.

11. The planting apparatus according to claim 1, wherein said stop is placed in a downward direction of the travel path of said travel arm.

12. The planting apparatus according to claim 8, wherein said stop includes a top surface and said travel arm includes a bottom surface, said top surface of said stop contacting said bottom surface of said travel arm to limit the vertical travel of said at least one closing disc.

13. A closing assembly for an agricultural row unit, comprising:
- a mounting body including a pair of surfaces carried by said mounting body and defining a space therebetween;
- a travel arm having branching portions at one end and pivotally connected to said mounting body at an opposite end, at least a portion of said travel arm held in said space between said pair of surfaces, said travel arm pivotally movable relative to said mounting body and defining a travel path;
- at least one closing disc pivotally connected to said mounting body by at least one branching portion of said travel arm and movable along the travel path of said travel arm;
- a stop placed in the travel path of said travel arm and configured to limit a vertical travel of said at least one closing disc, said stop mounted to at least one of said pair of surfaces; and
- a biasing element pivotally coupled at one end between branching portions of the travel arm and having an opposite end extending away from the travel arm for urging the at least one closing disc downward.

14. The closing assembly according to claim 13, wherein said mounting body includes a pair of side plates.

15. The closing assembly according to claim 14, wherein said biasing element is coupled at the one end between branching portions of the travel arm via a branching rod positioned through the one end of the biasing element and the branching portions.

16. The closing assembly according to claim 14, wherein each of said side plates includes at least one stop opening formed therethrough that is sized to hold said stop therein.

17. The closing assembly according to claim 13, wherein said biasing element includes a cylinder.

18. The closing assembly according to claim 13, wherein said stop includes a top surface and said travel arm includes a bottom surface, said top surface of said stop contacting said bottom surface of said travel arm to limit the vertical travel of said at least one closing disc.

* * * * *